United States Patent
Hwang et al.

(10) Patent No.: US 7,616,611 B2
(45) Date of Patent: Nov. 10, 2009

(54) PAGING METHOD FOR AN MBMS SERVICE IN A MOBILE COMMUNICATION SYSTEM

(75) Inventors: Sung-Oh Hwang, Yongin-si (KR); Kook-Heui Lee, Yongin-si (KR); Sung-Ho Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 561 days.

(21) Appl. No.: 10/983,862

(22) Filed: Nov. 8, 2004

(65) Prior Publication Data

US 2005/0153715 A1 Jul. 14, 2005

(30) Foreign Application Priority Data

Nov. 6, 2003 (KR) ............. 10-2003-0078484
Nov. 14, 2003 (KR) ............. 10-2003-0080757

(51) Int. Cl.
*H04J 3/00* (2006.01)
*H04W 68/00* (2006.01)

(52) U.S. Cl. .................. 370/336; 455/458
(58) Field of Classification Search ............ None
See application file for complete search history.

(56) References Cited

U.S. PATENT DOCUMENTS

| 6,532,224 B1 * | 3/2003 | Dailey ............. 370/337 |
| 2003/0088695 A1 | 5/2003 | Kwak et al. |
| 2003/0223394 A1 * | 12/2003 | Parantainen et al. ....... 370/336 |
| 2004/0066774 A1 * | 4/2004 | Kawaguchi et al. ......... 370/349 |
| 2004/0103435 A1 * | 5/2004 | Yi et al. ............. 725/81 |
| 2004/0117860 A1 * | 6/2004 | Yi et al. ............. 725/147 |
| 2004/0180675 A1 * | 9/2004 | Choi et al. ............. 455/458 |
| 2006/0040691 A1 * | 2/2006 | Diep et al. ............. 455/518 |
| 2006/0104225 A1 * | 5/2006 | Kim et al. ............. 370/313 |

FOREIGN PATENT DOCUMENTS

| CN | 1656844 | 8/2005 |
| EP | 1 213 939 | 6/2002 |
| JP | 2002-532942 | 10/2002 |

\* cited by examiner

*Primary Examiner*—Ricky Ngo
*Assistant Examiner*—Clemence Han
(74) *Attorney, Agent, or Firm*—The Farrell Law Firm, LLP

(57) ABSTRACT

A paging method for informing a UE of the existence or absence of control information in transmission of the control information according to the support of an MBMS in a mobile communication system. In the method, paging according to a voice and packet service and paging according to an MBMS are differentiated from each other. Accordingly, a first paging indication channel for identifying the paging according to the voice and packet service and a second paging indication channel for identifying the paging according to the MBMS are differentiated from each other and used.

13 Claims, 10 Drawing Sheets

| 601 | SIB 5 & 6 | |
|---|---|---|
| 602 | Other IEs | |
| 603 | S-CCPCH( has PCH) Info | PICH Info — 605 |
| 604 | S-CCPCH( has MCCH) Info | MBMS-PICH Info — 606 |

FIG.6A

| 611 | SIB 5 & 6 | |
|---|---|---|
| 612 | Other IEs | |
| 613 | S-CCPCH(has PCH and MCCH) Info | PICH Info — 614 |
| | | MBMS-PICH Info — 615 |

FIG.6B

PAGING METHOD FOR AN MBMS SERVICE IN A MOBILE COMMUNICATION SYSTEM

PRIORITY

This application claims priority to an application entitled "Paging Method For MBMS Service In Mobile Communication System" filed in the Korean Intellectual Property Office on Nov. 6, 2003 and assigned Serial No. 2003-78484 and Nov. 14, 2003 and assigned Serial No. 2003-80757, the contents of which are incorporated herein by reference.

BACKGROUND OF THE INVENTION

1. Field of the Invention

The present invention relates generally to a multimedia broadcast/multicast service (MBMS) for a mobile communication system, and more particularly to a paging method for indicating the presence of control information on an MBMS.

2. Description of the Related Art

Currently, a code division multiple access (CDMA) mobile communication system provides a voice service and a packet service for transmitting mass storage data. Further, the CDMA mobile communication system has been developed into a multimedia broadcast/communication system capable of providing multimedia services. Additionally, a broadcast service has been suggested for providing services from at least one multimedia data source to a plurality of user equipments (UEs). The broadcast service includes a multimedia broadcast/multicast service (MBMS) proposed by the $3^{rd}$ generation project partnership (3GPP).

The MBMS uses a multimedia transmission mode for transmitting data, such as real time images, voice data, still images, and characters. Thus, the MBMS may require sufficient transmission resources. Because a plurality of UEs may request the same MBMS, the MBMS is provided through a broadcasting channel.

The MBMS can be provided through two types of services, i.e., a point to point (PtP) service or a point to multi-point (PtM) service. In the PtP service, a dedicated channel must be assigned to each UE, and in the PtM service, a common channel must be assigned to UEs requesting the same MBMS.

FIG. 1 illustrates conventional UTRAN for providing the MBMS. Referring to FIG. 1, a UE 130 directly receives the MBMS and has hardware or software for supporting the MBMS. The UTRAN is a radio communication network for connecting the UE 130 to a CN 100. The UTRAN includes a plurality of radio network systems (RNSs) 110 and 120. The RNS 110 includes an RNC 111 and a plurality of nodes B 113 and 115 controlled by the RNC 111 and the RNS 120 includes an RNC 112 and a plurality of nodes B 114 and 116 controlled by the RNC 112. That is, the RNS 110 includes the RNC 111, a first node B 113, and a second node B 115 controlled by the RNC 111, and a plurality of cells controlled by the first node B 113 and the second node B 115. Similarly, the RNS 120 includes the RNC 112, a third node B 114 and a fourth node B 116 controlled by the RNC 112, and a plurality of cells controlled by the third node B 114 and the fourth node B 116. Typically, the total number of node Bs controlled by an RNC, and the total number of cells included in node Bs are determined according to a service provider, and performance of the RNC and the nodes B.

The UE 130 is connected to the UTRAN through a Uu interface 121 and the UTRAN is connected to the CN 100 through an Iu interface 122. Table 1 shows interfaces for connecting nodes to each other. The names for the interfaces shown in table 1 are stipulated in the 3GPP standard and may change.

TABLE 1

| Interface Name | Function |
| --- | --- |
| Uu | Interface between UE and UTRAN |
| Iu | Interface between UTRAN and CN |
| Gr | Interface between SGSN and HLR |
| Gn/Gp | Interface between SGSN and GGSN |
| Gi | Interface between GGSN and BM-SC |
| Gn/Gp | Interface between BM-SC and CP |

FIG. 2 schematically illustrates a structure of a UTRAN protocol. Referring to FIG. 2, messages of the upper layer processed in the UTRAN can be broadly classified as control data or user data.

In FIG. 2, the messages of the upper layer of the UTRAN are represented as a control plain (C-Plain) signaling 201 and user plain (U-Plain) data 202. The C-plain signaling 201 and the U-plain data 202 are messages of a non-access stratum (NAS). The NAS messages are not used for a radio connection between the UE and the UTRAN and the UTRAN does not necessary to know the contents of the NAS messages. Alternatively, messages used for the radio connection between the UE and the UTRAN are called access stratum (AS) messages, which are data or control signals used at an area below a radio resource control (RRC) 203.

The RRC 203 controls a physical layer (L1) relating to a connection between the UE and the UTRAN, a medium access control of layer 2 (L2/MAC), a radio link control of layer 2 (L2/RLC), a packet data convergency protocol of layer 2 (L2/PDCP), and a broadcast/multicast control of layer 2 (L2/BMC). Further, the RRC 203 controls the connection between the UE and the UTRAN, such as a physical call setting, a logical call setting, control information transmission/reception, and specific data transmission/reception between the UE and the UTRAN.

The L2/PDCP 204 receives data from an NAS layer and transmits the data to the L2/RLC 206 using a predetermined protocol. The L2/BMC 205 receives data required for the broadcast and multi-broadcast from the NAS layer and transmits the data to the L2/RLC 206 by using a predetermined protocol. The L2/RLC 206 receives a control message, which is transmitted to the UE from the RRC 203, processes the control message in an RLC #1 261 and an RLC #n 262 by considering characteristics of the control message, and transmits the processed control message to the LC/MAC 208 through a logical channel 207. Further, the L2/RLC 206 receives data from the L2/PDCP 204 and the L2/BMC 205, processes the data in an RLC #1' 263 and an RLC #n' 264 and transmits the processed data to the LC/MAC 208 through the logical channel 207. The number of RLCs formed in the L2/RLC 206 may depend on the number of radio links between the UE and the UTRAN.

The logical channel 207 is classified into a dedicated type logical channel for a predetermined UE and a common type logical channel for a plurality of UEs. Further, the logical channel 207 may be classified into a control type logical channel used for transmitting messages including data about control information and a traffic type logical channel used for transmitting messages including data about traffic information.

The type and functions of the logical channels 207 used in the 3GPP are shown in Table 2.

TABLE 2

| Channel Name | Function |
|---|---|
| BCCH (broadcast control channel) | Used for downward transmission from UTRAN to UE and for transmitting control information of a UTRAN system |
| PCCH (paging control channel) | Used for downward transmission from UTRAN to UE and for transmitting control information to UE when a position of a cell including UE is not known |
| CCCH (common control channel) | Used for PtM control information transmission between UE and a network and used when UE has no connection channel for RRC |
| DCCH (dedicated control channel) | Used for PtP control information transmission between UE and a network and used when UE has a connection channel for RRC |
| CTCH (common transport channel) | Used for PtM control information transmission between a network and a plurality of UEs |
| DTCH (dedicated transport channel) | Used for PtP control information transmission between a network and a UE |

The L2/MAC 208 manages radio resources and a connection between the UE and the UTRAN under the control of the RRC 203. Therefore, the L2/MAC 208 receives corresponding logical channels as shown in Table 2 from the L2/RLC 206 and transmits the corresponding logical channels to the L1 210 by mapping the corresponding logical channels with transport channels 209 represented in Table 3.

TABLE 3

| Channel name | Function |
|---|---|
| BCH (broadcast channel) | Mapped with BCCH to transmit data of BCCH |
| PCH (paging channel) | Mapped with PCCH to transmit data of PCCH |
| RACH (random access channel) | Used for network access and for transmitting control messages and short data from UE to a network<br>Mapped with DCCH, CCCH, or DTCH |
| FACH (forward access channel) | Used for transmitting control information messages or data from a network to UE or predetermined UEs<br>Mapped with BCCH, CTCH, CCCH, DTCH, or DCCH |
| DCH (dedicated channel) | Used for transmitting data and control information messages between a network and UE<br>Mapped with DCCH or DTCH |
| DSCH (down-link shared channel) | Downstream channel used for transmitting mass storage data from a network to UE<br>Mapped with DTCH or DCCH |
| HS-DSCH (high speed DSCH) | Downstream channel from a network to UE and having improved transmission efficiency as compared with DSCH<br>Mapped with DTCH or DCCH |

Although it is not illustrated in Table 3, other transport channels, such as an up-link shared channel and a common packet channel, can be used. However, because the transport channels are not directly associated with the present invention, the detailed description thereof will be omitted.

The transport channels 209 transmitted to the L1 210 illustrated in FIG. 2 are processed through a proper procedure corresponding to real physical channels and transmitted to the UE or the UTRAN. The physical channels include a primary common control physical channel (P-CCPCH), a secondary common control physical channel (S-CCPCH), a paging indicator channel (PICH), an acquisition indicator channel (AICH), a physical common packet channel (PCPCH), etc. Herein, a BCH is transmitted through the P-CCPCH, and a PCH and an FACH are transmitted through the S-CCPCH.

In order to provide the predetermined MBMS, basic information and service guide information on the MBMS must be transmitted from the UTRAN 110 to a plurality of UEs. If the UE 230 having received the basic information and service guide information on the MBMS wishes to receive MBMS, the UE 130 is registered in the CN 100, which is called "joining". A list of the UEs including the UE 130 and requesting the MBMS is transferred to nodes (e.g., the BM-SC, and the SGSN) included in the CN 100 and the UTRAN.

The CN 100, having received the list of the UEs requesting the predetermined MBMS, and UTRANs 110 and 120, which are connected to the CN 100, transmit a paging message to the UEs including the UE 130. A radio bearer (RB) is set in order to provide the MBMS to the corresponding UEs. Accordingly, the CN 100 can provide the MBMS to the UEs through the set RB.

When the MBMS has ended, it must be transferred to the all UEs. Therefore, the CN 100 and the UTRAN 120 having controlled the UEs release radio resources assigned to the UEs for the MBMS, in order to end the MBMS.

In the state in which the MBMS is provided to the UEs, a plurality of control messages relating to the MBMS are transmitted to the UEs to receive the MBMS. Herein, it is necessary to provide a method effectively capable of informing the UEs of the existence of the control messages.

Currently, the 3GPP has discussed scheme for using a conventional paging method used in voice communication or packet communication as a paging method in the MBMS.

FIG. 3 illustrates a paging procedure for reporting the existence of control information for a conventional MBMS and FIG. 4 illustrates a structure of a conventional paging indication channel.

Referring to FIG. 3, a method for paging a UE for voice communication or packet communication uses a PICH 301 and an S-CCPCH 302. The S-CCPCH 302 contains a PCH (transport channel) through which a PCCH is transmitted. The structure of the PICH 301 is illustrated in FIG. 4. The PICH 301 can transmit 288 bits for a radio frame (basic unit of a physical channel transmission in the 3GPP) with a length of 10 ms, classifies UEs into paging groups, and pages the paging groups. The number of the paging groups may become one of 144, 72, 36, and 18 and the number of bits used in a PI of each paging group may become 2, 4, 8, or 16.

The UE powers on a receiver after predetermined time periods according to a discrete reception (DRX) period determined by a CN and confirms the PICH 301 assigned to the UE. This enables power of the UE receiver to be turned off when the UE does not have to continuously receive a radio signal, thereby preventing the power consumption of the battery of the receiver.

In FIG. 3, the UE paging occasion (PO) 311 is a value calculated by the DRX cycle of the UE. When a paging indicator (PI) of a PICH received in the PO 311 has a positive value, the UE receives the S-CCPCH 302 transmitted after 7680 chip (about 2.00 ms). Further, the UE determines if a PCCH/PCH transmitting a paging message for the UE exists through the S-CCPCH 302. When the paging message for the UE does not exist, the UE turns off the receiver until the next PO. When the PI of the PICH received in the PO 311 has a negative value, the UE turns off the receiver and waits the next PO.

A method for informing the UE of whether a control message regarding an MBMS exists or not and data is transmitted or not uses the PICH 301, an MBMS PO 312, the S-CCPCH 302, or an S-CCPCH 303. The PICH 301 is a channel for informing the UE or other UEs of the existence or absence of a paging for voice call or packet call and the MBMS PO 312 set in all MBMSs or according to each MBMS is dedicated for a paging about the MBMS. An MBMS control channel (MCCH) transmitting control information on the MBMS is transmitted through the S-CCPCH 303. The S-CCPCH 303 may become an S-CCPCH different from the S-CCPCH 302. The S-CCPCH 302 can be used when a message for reporting the existence or absence of the control message regarding the MBMS is transmitted through the PCCH. It is assumed that the MCCH transmits the message for reporting the existence or absence of the control message regarding the MBMS.

Hereinafter, a process for enabling the UE to recognize the existence or absence of the control message regarding the MBMS will be described. More specifically, the UE having turned on the receiver in the MBMS PO 312 receives a PI on an MBMS in which the UE has joined. The length of the MBMS PO 312 may be identical to or smaller than the length of one radio frame (10 ms) constituting a PICH. When the received PI on the MBMS has a positive value, the UE receives the S-CCPCH 303 and receives the message enabling the UE to recognize the existence or absence of the control message on the MBMS.

The conventional paging method for reporting whether the control message on the MBMS exists or not and whether MBMS data is transmitted or not has the following problems.

First, conventionally, PICHs used by UEs that do not support an MBMS are dedicated for an MBMS PO. Therefore, UEs having a PO overlapping with the MBMS PO may unnecessarily demodulate an S-CCPCH. Further, when the MBMS PO is defined according to each service, a UE having joined in a plurality of MBMSs does not have enough time to turn off a receiver. Therefore, a battery of the receiver may be wasted.

Secondly, when UEs having joined in an MBMS have a DRX cycle defined on the MBMS or a DRX cycle defined according to each MBMS in addition to a DRX cycle owned by the UEs, the UEs must frequently turn on the receiver. Consequently, it is difficult to use the DRX cycle.

SUMMARY OF THE INVENTION

Accordingly, the present invention has been designed to solve the above and other problems occurring in the prior art, and it is an object of the present invention to provide an efficient paging method in a mobile communication system providing an MBMS.

It is another object of the present invention to provide a paging method for minimizing power consumption by waking a UE intended for reception of an MBMS, only at a necessary time point.

It is further another object of the present invention to provide a method for enabling a mobile communication system providing an MBMS to include a paging indication channel for only the MBMS.

It is still another object of the present invention to provide a paging method using a separate paging indication channel that is different from a conventional paging indication channel used in a paging according to voice call or packet call in a mobile communication system providing an MBMS.

It is yet another object of the present invention to provide a paging method for informing the existence or absence of control information through a paging indication channel for an MBMS, transmitting a message capable of reconfirming the existence of the control information through an MCCH, and retransmitting the control information through the MCCH, in a mobile communication system providing the MBMS.

It is yet another object of the present invention to provide a method capable of preventing an abnormal operation of UEs, which do not support an MBMS, in using a paging indication channel for the MBMS.

It is yet another object of the present invention to provide an efficient paging method in spite of the existence of multiple MBMSs in using a paging indication channel for the MBMS.

It is yet another object of the present invention to provide a method for transmitting channel information on a paging indication channel for an MBMS through a system information block of a broadcast channel through which channel information on an existing paging indication channel is transmitted.

It is yet another object of the present invention to provide a method for defining channel information on a paging indication channel for an MBMS as a separate system information block and transmitting the channel information.

It is yet another object of the present invention to provide a method for enabling a paging indication channel for an MBMS to be transmitted while temporally working in concert with an S-CCPCH transmitting an MCCH and enabling a UE to efficiently receive the S-CCPCH.

It is yet another object of the present invention to provide a method for enabling a UE to receive a paging indication channel for an MBMS at a PO corresponding to a DRX cycle.

It is yet another object of the present invention to provide a method for mapping a paging indication channel for an MBMS and information for identifying the MBMS.

In accordance with one aspect of the present invention, there is provided a method for paging a UE by a radio access network in order to provide an MBMS to the UE in a mobile communication system including at least one UE and the radio access network. The method includes the steps of: transmitting a first channel information on a paging indication channel and a second channel information on a control channel to the UE, the paging indication channel identifying existence of a paging for the MBMS and the control channel transmitting paging information of the MBMS; transmitting the paging indication channel in response to the MBMS when a paging request of the UE occurs in response to the MBMS; and transmitting the paging information of the MBMS through the control channel in response to transmission of the paging indication channel.

In accordance with another aspect of the present invention, there is provided a method for receiving a paging for an MBMS by a UE from a radio access network providing the MBMS to the UE in a mobile communication system including at least one UE and the radio access network. The method includes the steps of: receiving a first channel information on a paging indication channel and a second channel information on a control channel from the radio access network, the paging indication channel identifying existence of a paging for the MBMS and the control channel transmitting paging information of the MBMS; receiving the paging indication channel from the radio access network through the first channel information; receiving the control channel from the radio access network through the second channel information when transmission of the control channel corresponding to the MBMS is checked by the paging indication channel; and checking if the MBMS has been paged by the paging information received through the control channel.

BRIEF DESCRIPTION OF THE DRAWINGS

The above and other objects, features, and advantages of the present invention will be more apparent from the following detailed description taken in conjunction with the accompanying drawings, in which:

FIGS. 6A to 6C illustrate examples reporting channel information on an MBMS PICH according to an embodiment of the present invention;

DETAILED DESCRIPTION OF THE PREFERRED EMBODIMENT

Figure 1:
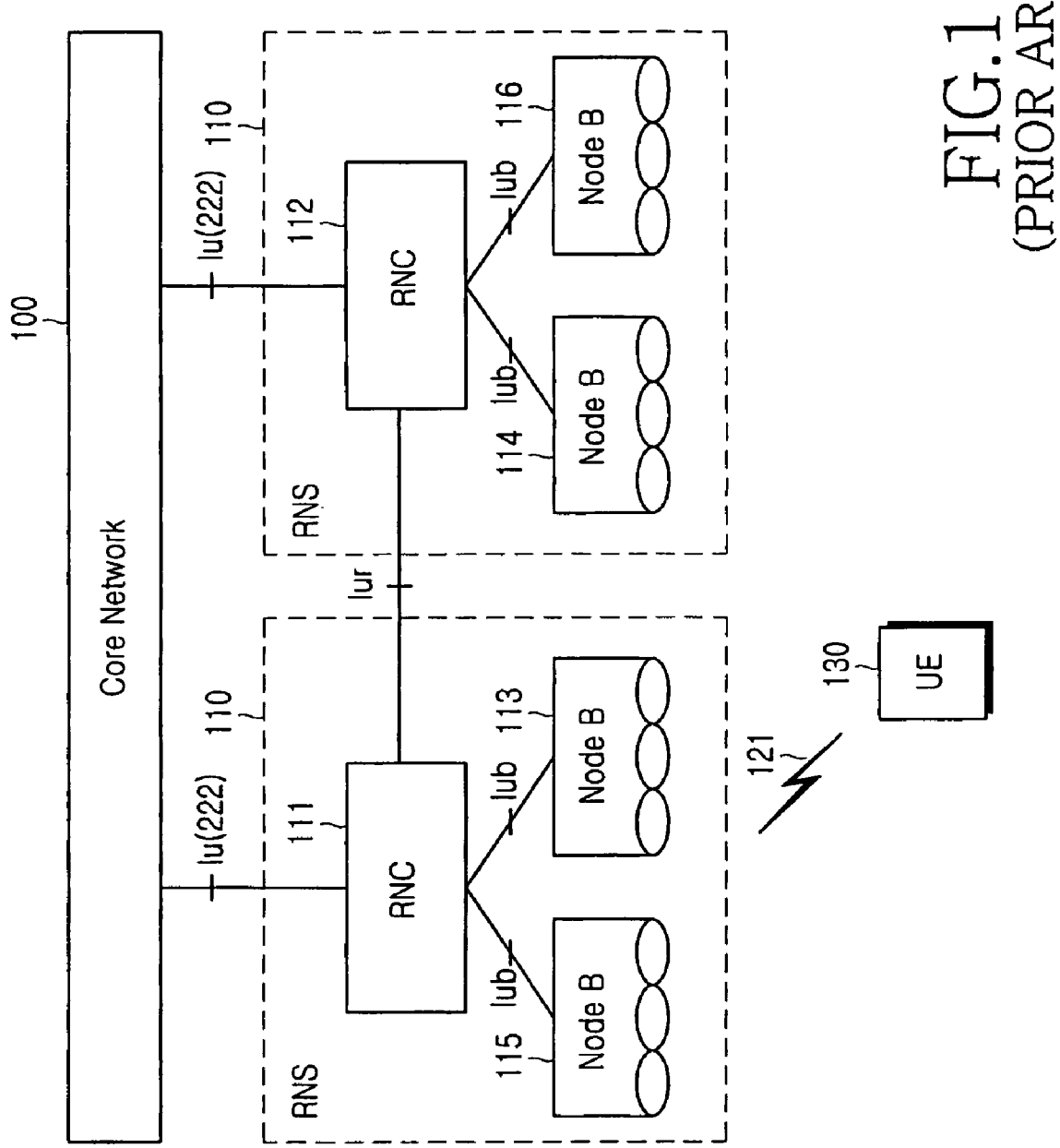
FIG. 1 illustrates a radio access network constituting a mobile communication system providing an MBMS.
Figure 2:
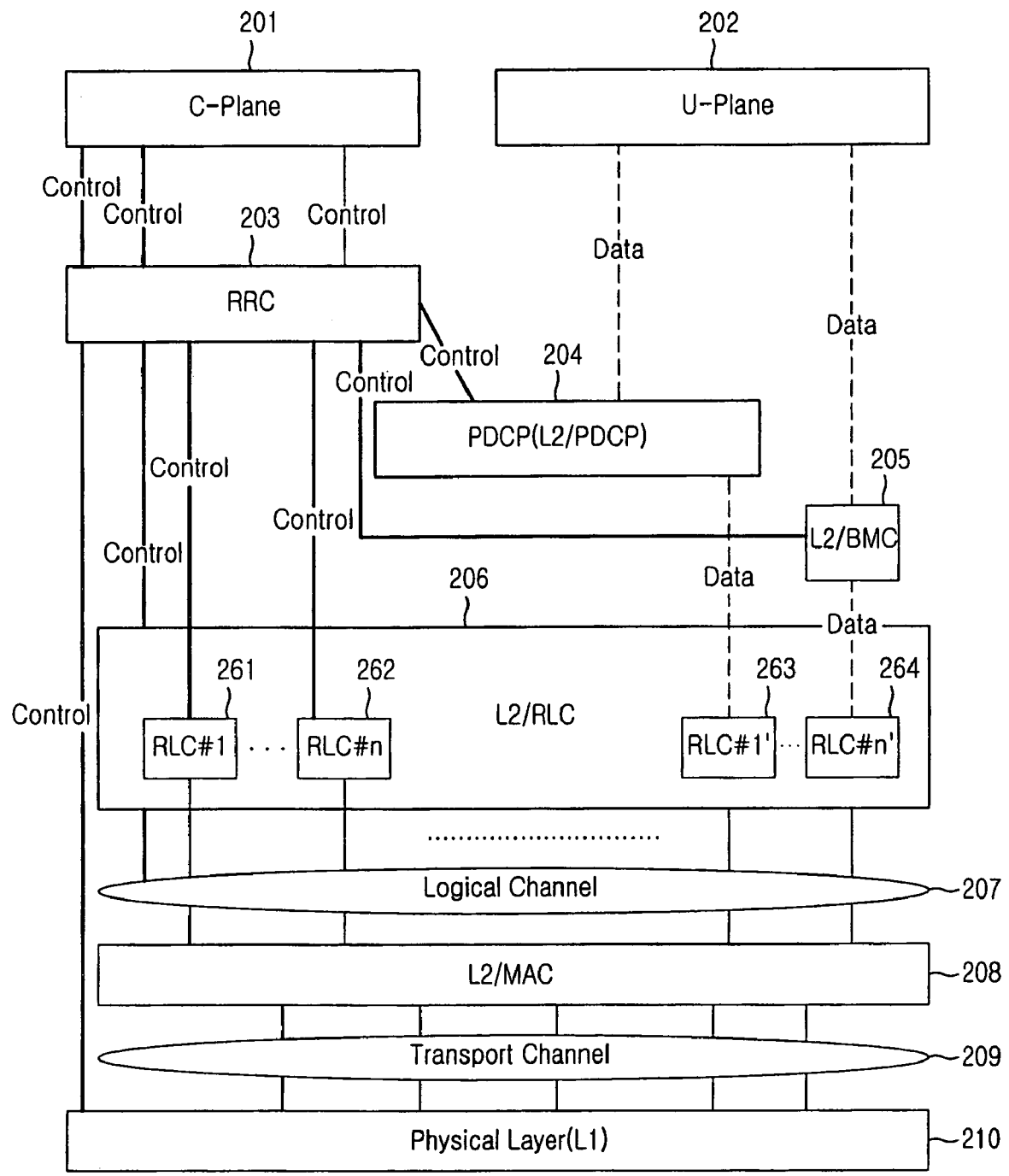
FIG. 2 illustrates a protocol structure of a radio access network.
Figure 3:
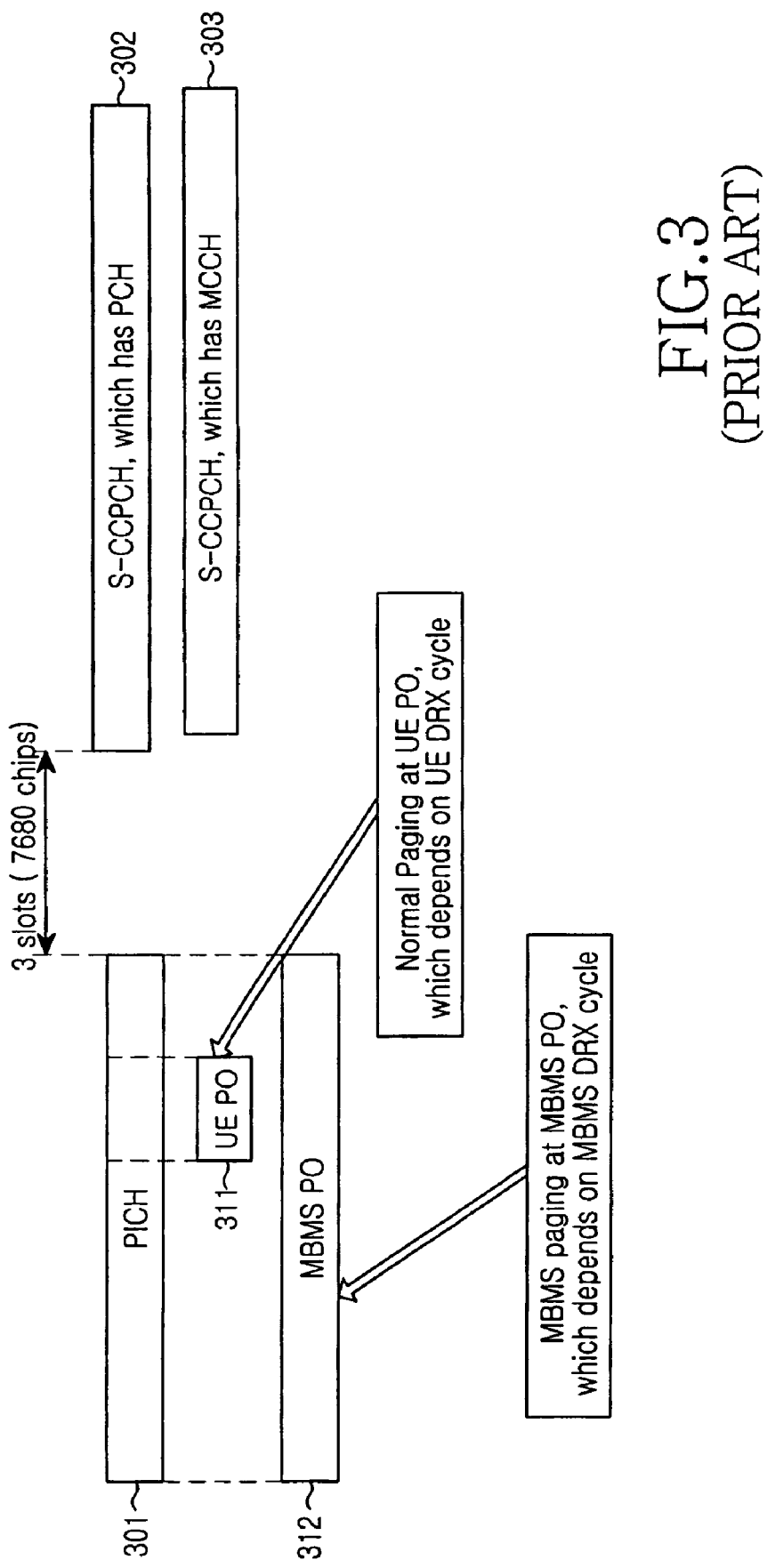
FIG. 3 illustrates a paging procedure for reporting the existence of control information on a conventional MBMS.
Figure 4:
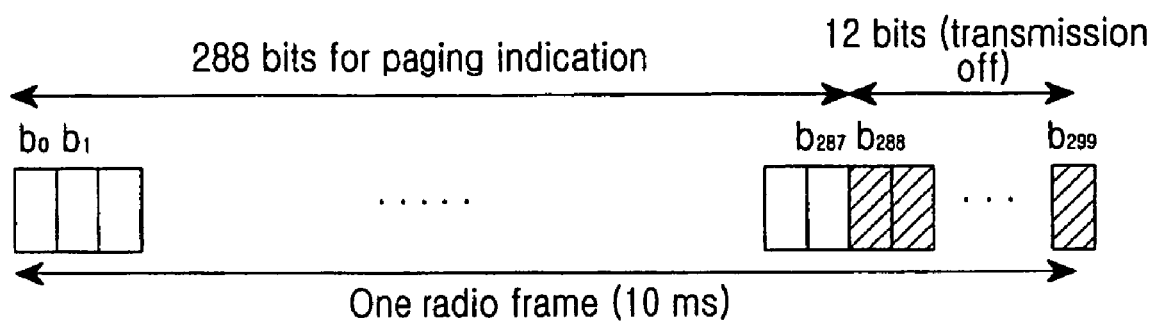
FIG. 4 illustrates a conventional paging indication channel.

Preferred embodiments according to the present invention will be described in detail herein below with reference to the accompanying drawings. In the following description of the present invention, a detailed description of known functions and configuration incorporated herein will be omitted when it may obscure the subject matter of the present invention.

Further, for effective description of the present invention, a mobile communication network of the 3GPP, which is a standard of an asynchronous mobile communication scheme, is utilized as an example of a mobile communication system. Additionally, although the following detailed description is given on an MBMS as an embodiment of the present invention, it is apparent to those related in the art that the present invention can be applied to a broadcast service as well as the MBMS.

An embodiment of the present invention, which will be described later, proposes a new paging method for the MBMS in order to prevent the power of a UE from being unnecessarily wasted. This method reduces the consumption of a battery by enabling a UE requesting the MBMS to awake at a predetermined time and to confirm the existence or absence of a paging corresponding to the MBMS. Accordingly, in the paging method according to the embodiment of the present invention, states of a UE to which the paging method is applied must be defined and a paging indication channel for the MBMS must be newly defined.

Additionally, a transmission procedure of control information for receiving a newly defined PICH and a structure of a system information block for transmitting the control information must be defined.

Further, a relation between the PICH and an S-CCPCH according to the MBMS must be defined. In the description that will be given herein below, a paging indication channel corresponding to voice call or packet call will be referred to as a "PICH" and a paging indication channel newly proposed for an MBMS will referred to as an "MBMS PICH".

The present invention can be applied to a UE in either an IDLE state, a CELL_PCH state, or a URA_PCH state, after requesting a predetermined MBMS. Hereinafter, the aforementioned states will be described.

(1) CELL_PCH state: a UE in the CELL_PCH state receives a PICH in a PO based on its own DRX parameter and does not receive other downward channels such as FACHs. Before transmitting data to the UE, an RNC directs the UE to be shifted to a CELL_FACH state through a paging procedure. Similarly, the UE must shift to the CELL_FACH state before transmitting data to the RNC. The RNC tracks the position of the UE by the cell. The paging procedure uses a DRX parameter determined by the RNC.

(2) URA_PCH state: except that the RNC tracks the position of the UE by the UTRAN registration area (URA) including a plurality of cells, the URA_PCH state is identical to the CELL_PCH state.

(3) IDLE state: the RNC does not know the position of the UE and can page the UE based on the request of a CN. The paging procedure is identical to that of the CELL_PCH state, except that a DRX parameter determined by the CN is used. An RRC connection setup process must be previously performed before the RNC and the UE transmit data.

In a conventional paging procedure, a UE periodically receives a PICH signal transmitted from a node B and determines if a PCH signal is transmitted to the UE through the received PICH signal. Information on the PICH is contained in a system information block (SIB) of a BCH. Accordingly, the UE confirms the BCH to obtain the PICH information.

The paging procedure is a general process in which a network pages a predetermined UE. When the network pages the UE, a DRX scheme is used to minimize power consumption of the UE. In the DRX scheme, the UE sets a time point at which a receiver is turned on with a network in advance in order to receive a paging message and receives the paging message at only the preset time point. The UE turns on the receiver at only the preset time and turns off the receiver at other time points except for the preset time by means of the DRX scheme. Therefore, the power consumption of the receiver is minimized.

More specifically, the UE receives a PICH signal at a PO. When a corresponding paging instance (PI) of the received PICH signal has been set to 1, the UE receives a paging message transmitted through a PCH.

The present invention proposes a method by which a UE can simultaneously perform the aforementioned conventional paging procedure (normal paging) and an MBMS paging procedure (MBMS paging). The normal paging can be defined as a paging procedure performed by voice call or packet call, and the MBMS paging can be defined as a paging procedure performed in response to an MBMS.

Figure 5:
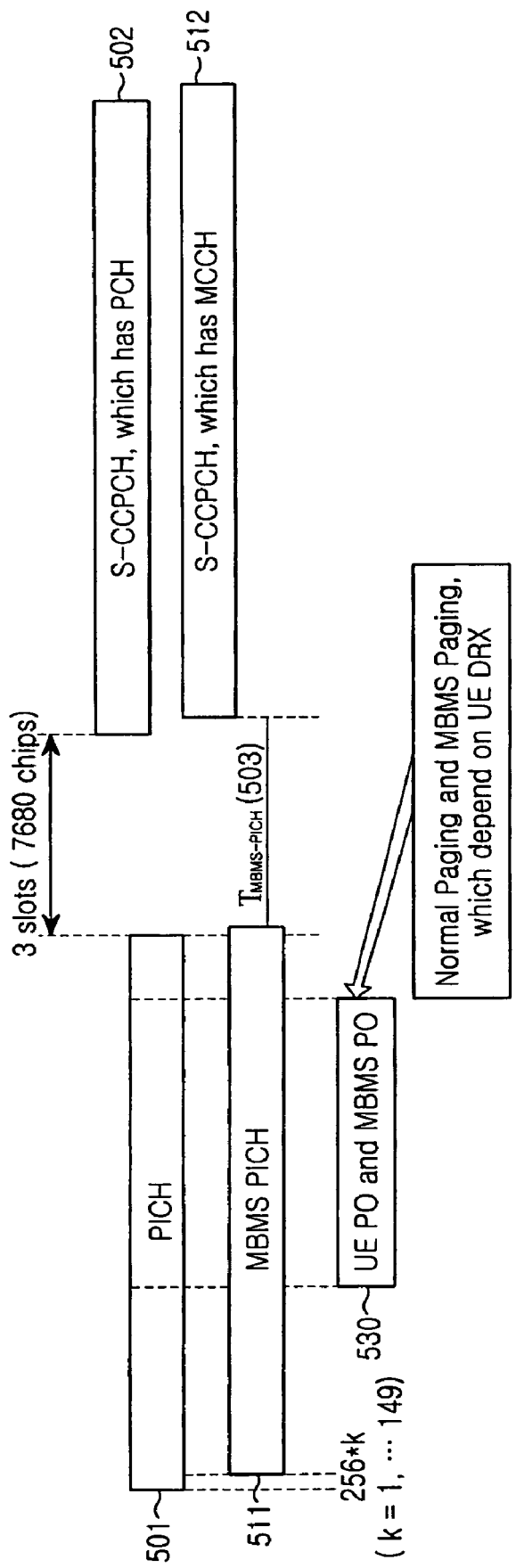
FIG. 5 illustrates a paging procedure for reporting the existence of control information on an MBMS according to an embodiment of the present invention.

FIG. 5 illustrates a paging procedure for reporting the existence of control information on an MBMS according to an embodiment of the present invention. Referring to FIG. 5, a PICH 501 denotes a paging indication channel enabling a predetermined UE to confirm if a normal paging, which pages the UE, exists. An MBMS PICH 511 denotes a paging indication channel enabling the UE to confirm if an MBMS paging for an MBMS in which the UE have joined exists. The PICH 601 temporally inter-works with an S-CCPCH 502 transmitting a PCH.

In the 3GPP, a difference between transmission time of the PICH 501 and transmission time of the S-CCPCH 502 is defined as 7680 chips (about 2 ms). Similarly, the MBMS PICH 511 temporally inter-works with an S-CCPCH 512 transmitting an MCCH and difference between transmission time of the MBMS PICH 511 and transmission time of the S-CCPCH 512 can be defined as a $T_{MBMS\text{-}PICH}$ 503. The $T_{MBMS\text{-}PICH}$ 503 may be identical to or different from the difference between the transmission time of the PICH 501 and the transmission time of the S-CCPCH 502. However, because the difference between the transmission time of the PICH 501 and the transmission time of the S-CCPCH 502 is defined as 256*k (k=1, 2, . . . , 149) in the 3GPP, the $T_{MBMS\text{-}PICH}$ 503 has a value of an integer time of 256*k (k=1, 2, . . . , 149). When the $T_{MBMS\text{-}PICH}$ 503 is used as only one value, it is unnecessary to report the value of the $T_{MBMS\text{-}PICH}$ 503 through a separate signaling. However, if the $T_{MBMS\text{-}PICH}$ 503 has a variable value, the value of the $T_{MBMS\text{-}PICH}$ 503 may be reported through a BCH.

In FIG. 5, the UE receiving the PICH 501 and the MBMS PICH 511 simultaneously receives the two PICHs 501 and 511 at a UE PO and confirms if a normal paging and an MBMS paging exist. When the normal paging exists, the UE receives the S-CCPCH 502 and confirms if a paging message exists. However, when the MBMS paging exists, the UE receives the S-CCPCH 512 and confirms if a paging message exists. Further, when the normal paging and the MBMS paging exist simultaneously, when the UE has reception ability, the UE simultaneously receives the S-CCPCHs 502 and 512. However, when the UE does not have the reception ability, a reception sequence is determined according to priority determined in an upper layer of the UE.

The PICH 501 and the MBMS PICH 511 can transmit 288 PIs in one radio frame as described above. The MBMS PICH 511 can transmit 300 bits, but it is assumed that the MBMS PICH 511 transmits only 288 bits for compatibility with the PICH transmitting the normal paging in the present invention. In the description above, the 288 bits transmitted through the PICH for the normal paging are assigned to each paging group by the predetermined number. Accordingly, the number of PICH bits assigned to each paging group becomes 2, 4, 8, and 16. Herein, the number of PIs capable of being transmitted for one PICH frame is defined as an $N_p$ and the $N_p$ may have a value of 144, 72, 36, or 18. The UE can determine a paging group including the UE and confirm the value of a PI for the paging group using Equation (1).

$$PI = IMSI \bmod N_p \quad (1)$$

In Equation (1), IMSI (International Mobile Subscriber Identity) is an unique identifier assigned to the UE. Further, mod denotes a modular calculation and a result of the modular calculation is a remainder obtained by dividing a number located at the front of the mod operator by a number located behind the mod operator. For example, a result of 5 mod 2 is 1.

The UE confirms the PI of the paging group and checks if a paging for the UE exists. For example, when the $N_p$ has a value of 18 and a mod calculation result of an IMSI value of the UE and the $N_p$ is 1, bits from the $17^{th}$ bit to the $31^{th}$ bit become a PI for a paging group. When the PI has a positive value, the UE receives an S-CCPCH corresponding to the PICH. However, when the PI has a negative value, the UE waits the next PO by a DRX cycle of the UE.

The MBMS PICH 511 proposed in the present invention also has a corresponding relation of a PI (MBMS PI) for an MBMS and an MBMS in which the UE has joined, similarly to the PICH 501 for the normal paging. The corresponding relation may be defined in Equation (2).

$$MBMS\ PI = TMGI \bmod N_{Mp} \quad (2)$$

In Equation (2), the $N_{Mp}$ denotes the number of MBMS PIs transmitted to one-radio frame and may have a value of 18, 36, 72, or 144. The $N_{Mp}$ may be received through the BCH through which the UE having joined in the MBMS previously transmits system information of a cell. Further, TMGI (Temporary MBMS Group Identity) denotes a temporary identity capable of being assigned to a predetermined MBMS by a SGSN, BM-SC, or RNC. Further, the TMGI is used when the UE distinguishes an MBMS in which the UE have joined from other MBMSs.

In the present invention, it is assumed that the UE determines a PI for the MBMS in which the UE have joined by means of the TMGI. However, an unique identifier for the MBMS may be used. The TMGI can be obtained in a step in which the UE joins the MBMS.

The UE receives its own TMGI by means of the MBMS PI value determined by Equation (2). That is, the UE receives the MBMS PI reporting the existence of MBMS paging information representing transmission of control information or data on MBMS requested by the UE.

When receiving the MBMS PI having a positive value, the UE receives the S-CCPCH 512 and an FACH (transport channel) transmitted through the S-CCPCH 512. The UE receives an MCCH transmitted in the FACH and confirms if paging information on an MBMS corresponding to the MBMS PI. The paging information on the MBMS includes an MBMS identifier and may include other information if necessary.

Further, in transmitting the MBMS PICH and MBMS PIs, it is possible not to transmit the MBMS PICH during an interval in which there is no paging for information to be transmitted through the MBMS PICH, that is, a predetermined MBMS. When the MBMS PICH is being transmitted, MBMS PIs having paging information corresponding to the MBMS PI from among the MBMS PIs transmitted through the MBMS PICH are transmitted. However, it is possible not to transmit MBMS PIs, which do not have the paging information corresponding to the MBMS PI. When discontinuous transmission of the MBMS PICH and the MBMS PIs is used, transmission power of a base station can be saved.

Figure 6C:
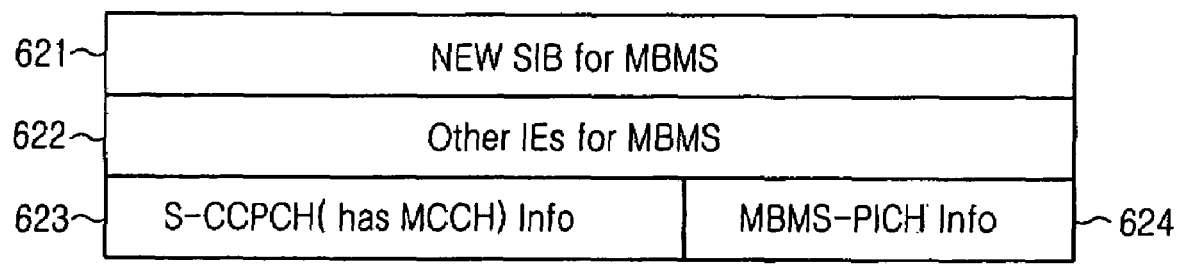

FIGS. 6A to 6C illustrate examples of reporting channel information on an MBMS PICH according to an embodiment of the present invention. More specifically, FIG. 6A illustrates an example in which the channel information on the MBMS PICH is added to SIBs 5 and 6 used in reporting channel information of an upward/downward common channel in the current 3GPP. The SIBs 5 and 6 are transmitted through a BCH. The SIB 5 is information on the upward/downward common channel used by UEs in an idle mode and the SIB 6 is information on the upward/downward common channel, which includes an RRC connection, used by UEs. The BCH can transmit 16 different types of SIBs in addition to the SIBs 5 and 6. A detailed description on the 16 types of different SIBs will be omitted because it is not necessarily associated with the present invention.

In FIG. 6A, the reference numeral 601 is an identifier of SIBs 5 and 6 and the reference numeral 602 represents other information elements (IEs) to be contained in the SIBs 5 and 6. A detailed description of the IEs 602 will be omitted because they are not associated with the present invention.

The reference numeral 603 represents channel information on an S-CCPCH, which will transmit a PCH, and other IEs. The channel information on the S-CCPCH and other IEs may include physical channel information used by the S-CCPCH, information of transport channels transmitted through the S-CCPCH, transmission combination information of the transport channels, etc. The reference numeral 605 represents physical channel information on a PICH corresponding to the PCH transmitted by the S-CCPCH designated by the reference numeral 603 and may denote a scrambling code, an orthogonal code, etc., used by the PICH. The scrambling code is a code used for differentiating different downward physical channels from each other between base stations or in the same base station. The orthogonal code differentiates the different downward physical channels when the different downward physical channels use the same scrambling code. The reference numeral 604 represents channel information on the S-CCPCH, which includes an FACH transmitting an MCCH, and other IEs.

Herein, the IEs of the reference numeral 603 and the reference numeral 604 may be equal to each other, but contents of the IEs are different from each other. The reference numeral 706 represents channel information on the MBMS PICH corresponding to the S-CCPCH including the FACH for transmitting the MCCH. Further, the reference numeral 606 may include the physical channel information used by the MBMS PICH together with information on transmission time difference between the MBMS PICH and the S-CCPCH including the FACH for transmitting the MCCH.

In the current 3GPP, only the S-CCPCH transmitting the PCH can correspond to one PICH and one S-CCPCH can include only one PCH. In FIG. 6A, if the S-CCPCH, which does not include the PCH, also transmits the MCCH, it is proposed that the S-CCPCH can include the MBMS PICH.

FIG. 6B illustrates an example on a method in which the channel information on the MBMS PICH is added to the SIBs 5 and 6 when the FACH transmitting the PCH and the MCCH is transmitted through one S-CCPCH.

In FIG. 6B, the reference numerals 611 and 612 may be equal to the reference numerals 601 and 602 in FIG. 6A. The reference numeral 613 may be IEs reporting information on the FACH transmitting the PCH and the MCCH. The reference numeral 614 is channel information of the PICH corresponding to the PCH and the reference numeral 615 is channel information of the MBMS PICH corresponding to the FACH, which will transmit the MCCH. In the current 3GPP, only one PICH can correspond to one S-CCPCH. However, in the present invention, the PICH for the normal paging and the PICH for the MBMS paging can correspond to the S-CCPCH, in consideration of the fact that FACH transmitting the MCCH, and the PCH transmitting the PCCH can be transmitted through one S-CCPCH.

FIG. 6C illustrates an example on a method in which the channel information on the MBMS PICH is added to an SIB when the SIB for an MBMS is newly defined. In FIG. 6C, the reference numeral 621 may be a new SIB indication number for the SIB for the MBMS. The reference numeral 622 denotes other IEs for the MBMS and may be MBMS-related system information, etc. The reference numeral 623 may be information on the S-CCPCH, which will transmit the MCCH. Herein, it is possible not to transmit the channel information on the S-CCPCH which will transmit the MCCH to the SIBs 5 and 6.

The reference numeral 624 denotes channel information on the MBMS PICH. The SIB for the MBMS is separately defined, such that UEs that do not support the MBMS do not have to unnecessarily receive information on the MBMS. Further, because the SIBs 5 and 6 are SIBs including information on a common channel used by all UEs, specific characteristics of the SIBs 5 and 6 can be maintained if the SIB for the MBMS is separately defined. Also, MBMS PICH transmission power information in addition to the MBMS PICH-related information are transmitted, such that a UE can easily receive the MBMS PICH.

The aforementioned proposal of the present invention is summarized as follows:

1. PICH for an MBMS is separately defined. The PICH for an MBMS is separately defined, thereby preventing an abnormal operation of UEs, which does not support the MBMS;

2. UE receives an MBMS PICH according to a DRX cycle originally possessed by the UE. Accordingly, battery consumption of UEs supporting the MBMS can be reduced;

3. S-CCPCH transmitting an MCCH corresponds to the MBMS PICH; and

4. Channel information of the MBMS PICH is SIBs 5 and 6, or an SIB defined for MBMS, and can be transmitted to UEs.

Figure 7:
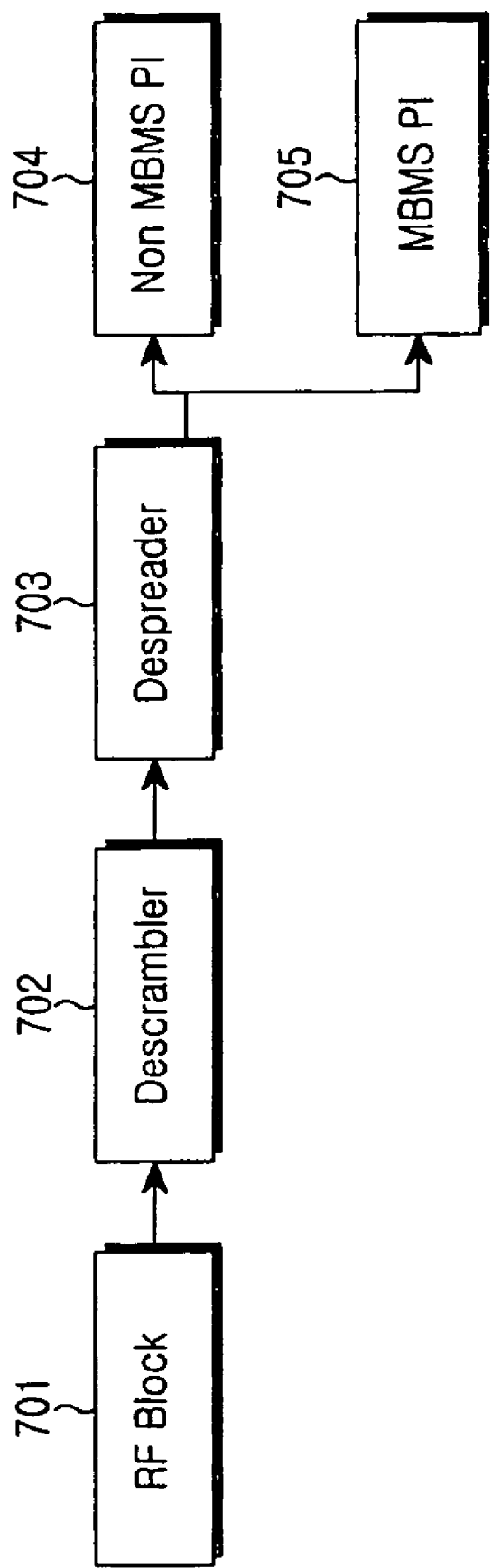
FIG. 7 illustrates a receiver in a UE according to an embodiment of the present invention.

FIG. 7 illustrates a receiver in a UE according to an embodiment of the present invention. In FIG. 7, unnecessary elements in describing the embodiment of the present invention are omitted. Further, because a base station has a structure for transmitting plural PICHs, a description on a base station transmitter are omitted.

Referring to FIG. 7, an RF block 701 converts a radio signal to a baseband signal and outputs the baseband signal. A downward signal converted to the baseband signal by the RF block 701 is descrambled by a descrambler 702 using a predetermined descrambling code. Therefore, the descrambled signal is differentiated from signals of other base stations or a channel using a descrambing code different from a PICH and an MBMS PICH. The descrambled signal is despread by a despreader 703 using a predetermined channelization code and is then output to a non-MBMS PI 704 and an MBMS PI 705. The non-MBMS PI 704 and the MBMS PI 705 may be simultaneously received and vice versa. When the non-MBMS PI 704 and the MBMS PI 705 are simultaneously received, priority of a PCH confirmation or priority of a MCCH confirmation may conform to command of an upper layer.

Figure 8:
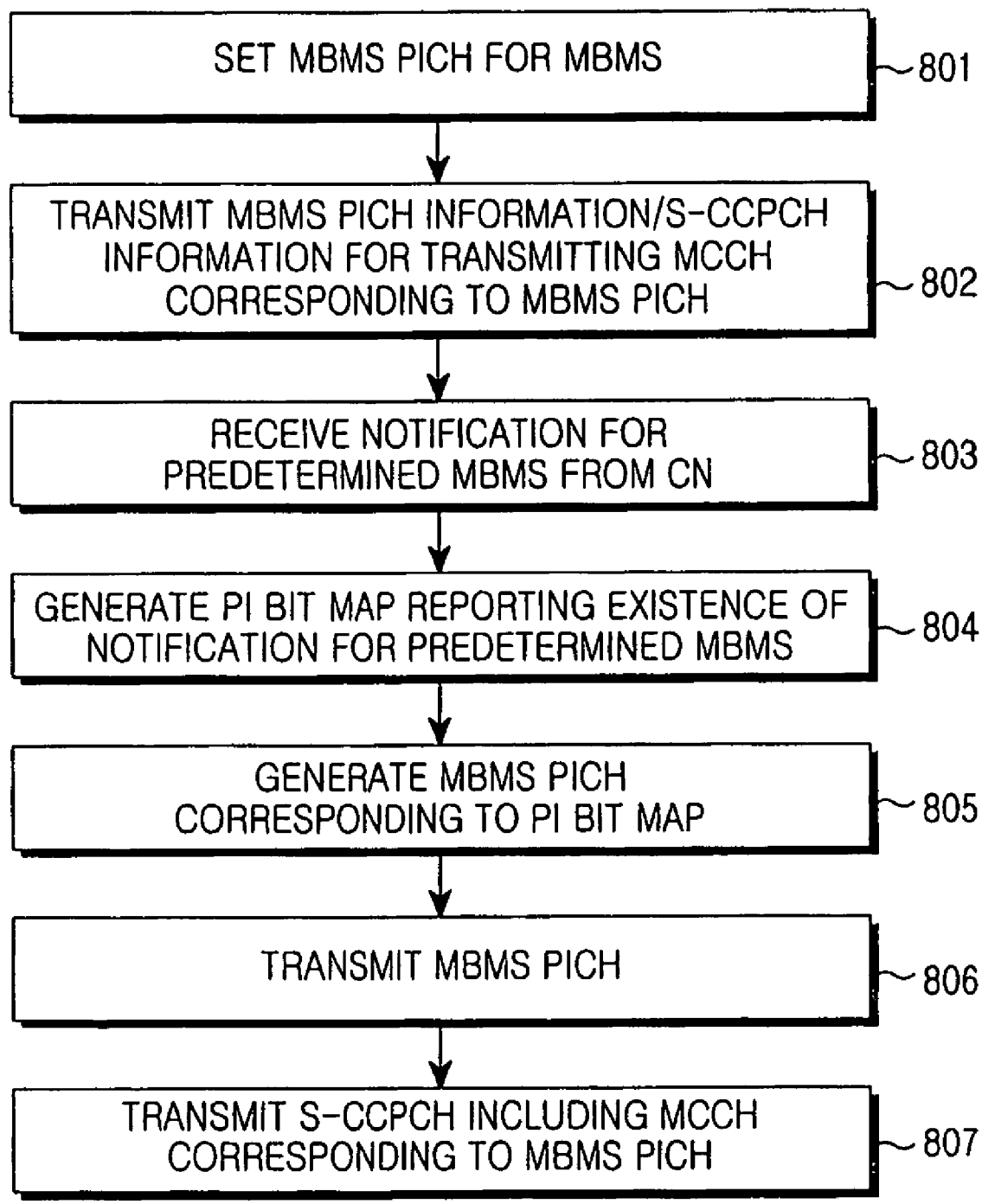
FIG. 8 illustrates an example of an operation performed in a radio access network according to an embodiment of the present invention.
Figure 9:
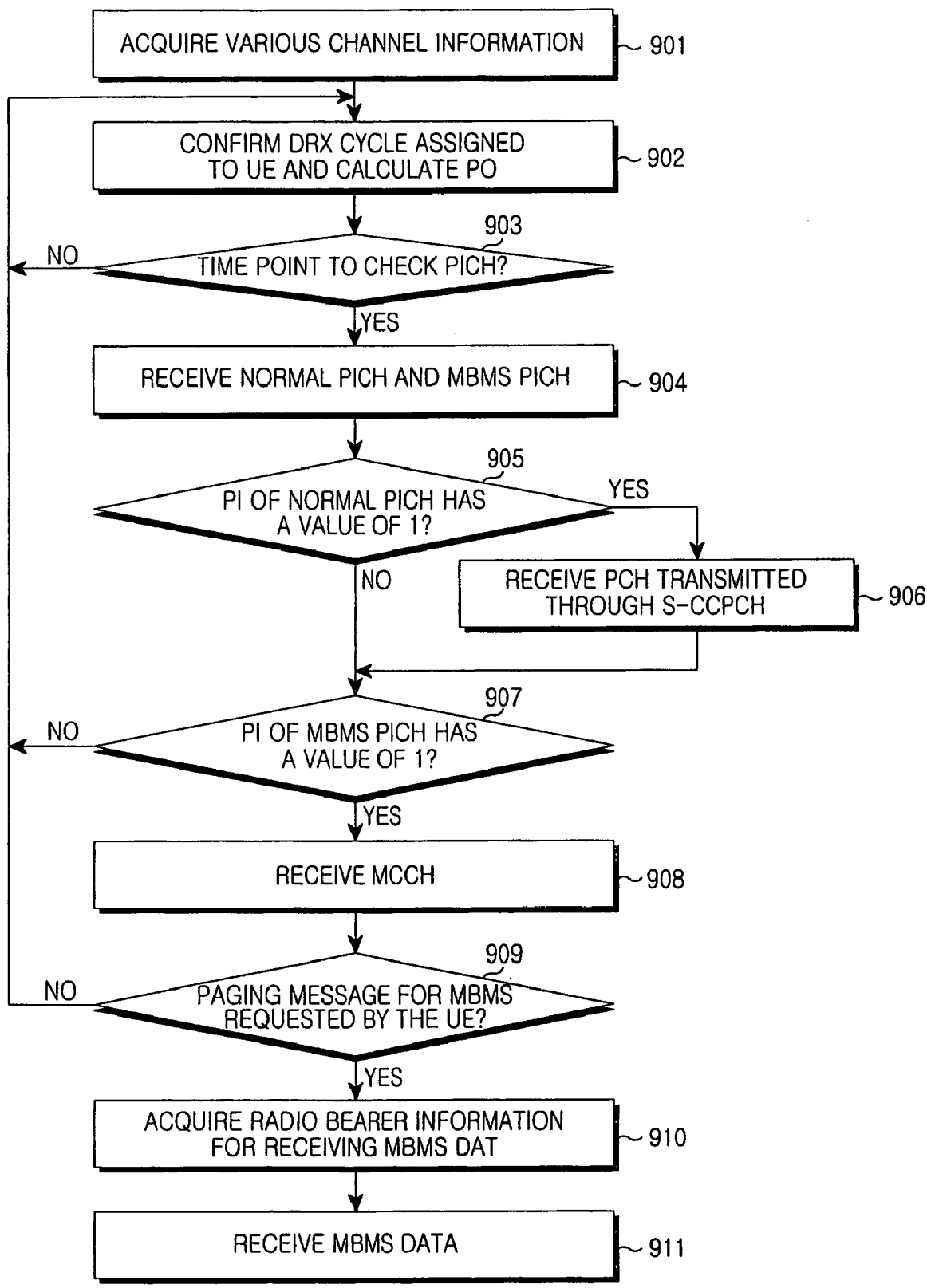
FIG. 9 illustrates an example of an operation performed in a UE according to an embodiment of the present invention.

FIG. 8 is a flow diagram illustrating an example of an operation performed in a radio access network according to an embodiment of the present invention and FIG. 9 is a flow diagram illustrating an example of an operation performed in a UE according to an embodiment of the present invention.

Referring to FIG. 8, the UTRAN sets the MBMS PICH for the MBMS in step 801 and transmits information on the MBMS PICH and information on the S-CCPCH for transmitting the MCCH corresponding to the MBMS PICH in step 802. A transmission method for the information has been already described with reference to FIG. 6. The UTRAN receives a notification message for a predetermined MBMS in step 803.

After receiving the notification message, the UTRAN generates an MBMS PI bit map reporting the existence of the notification message for the predetermined MBMS in step 804. The MBMS PI bit map is used when the MBMS PICH is created. The MBMS PI bit map is created in the RNC and is transmitted to the node B. The node B creates the MBMS PICH based on the MBMS PI bit map and transmits the MBMS PICH to UEs in each cell. The MBMS PI bit map may also be transmitted every 10 ms.

Further, because the MBMS PICH must be repeatedly transmitted for a predetermined period of time so that all UEs having joined in the MBMS can receive the MBMS PICH, the MBMS PICH may also be transmitted only one time together with a repetition transmission time parameter.

The node B in the UTRAN generates an MBMS PICH corresponding to the MBMS PI bit map in step 805 and transmits the generated MBMS PICH in step 806.

Further, the node B transmits the S-CCPCH including the MCCH corresponding to the MBMS PICH in step 807.

Herein, paging information on the predetermined MBMS is transmitted through the MCCH. The paging information is transmitted after an initial transmission of the MBMS PICH and can be repeatedly transmitted for a predetermined period of time so that all UEs can receive the paging information.

Additionally, the paging information can be repeatedly transmitted only several times according to a preset value so that all UEs can listen the paging information. When the paging information is repeatedly transmitted only several times, a time point at which the S-CCPCH including the MCCH is transmitted can be determined in advance.

Referring to FIG. 9, the UE acquires various channel information through the BCH in step 901. The acquired channel information may include channel information of the PICH, channel information of the S-CCPCH transmitting the PCH corresponding to the PICH, channel information of the MBMS PICH, and channel information of the S-CCPCH transmitting the MCCH corresponding to the MBMS PICH. The UE confirms a UE DRX cycle and calculates the PO in step 902 and determines if it is a time point to check the PICH in step 903.

When it is time to check the PICH, step 904 is performed. That is, the UE receives the PICH for the normal paging and the MBMS PICH for the MBMS. In the PICH, when the PI corresponding to the UE has a value of 1 in step 905, step 906 is performed. However, when the PI corresponding to the UE does not have a value of 1, step 907 is performed.

In step 907, the UE confirms if the PI of the MBMS PICH has a value of 1. When the PI of the MBMS PICH does not have a value of 1, the process returns to step 902. That is, the aforementioned procedure is repeated. However, when the PI of the MBMS PICH has a value of 1, the UE receives the MCCH transmitted through the S-CCPCH in step 908.

In step 908, when it is not a time point to receive the S-CCPCH transmitting the MCCH, the UE waits for a predetermined period of time and receives the S-CCPCH transmitting the MCCH at a corresponding time point.

In step 909, the UE confirms if a paging message for an MBMS requested by the UE is contained in an MBMS paging message of the MCCH received through the S-CCPCH. When it is confirmed that the paging message for the MBMS requested by the UE is not contained in the MBMS paging message, the process returns to step 902. That is, the aforementioned procedure is repeated. However, when the paging message for the MBMS requested by the UE is contained in the MBMS paging message, step 910 is performed. That is, the UE acquires radio bearer (RB) information for receiving MBMS data. The RB is a path through which signaling or data can be transmitted, between the UTRAN and the UE in the 3GPP. In step 911, the UE receives MBMS data for the MBMS requested by the UE on the basis of the acquired RB information.

As described above, the present invention proposes a paging method for informing a UE of the existence of transmission of control information or data in transmitting the MBMS-related control information or the data. In the paging method, an MBMS PICH is used to prevent an abnormal operation of other UEs, which do not support an MBMS. Further, the present invention proposes a structure of the MBMS PICH and a method capable of reporting information on the MBMS PICH. Furthermore, in using the methods proposed by the present invention, additional loss of batteries of UEs supporting the MBMS can be minimized in receiving MBMS paging information.

Although preferred embodiments of the present invention have been described for illustrative purposes, those skilled in the art will appreciate that various modifications, additions, and substitutions are possible, without departing from the scope and spirit of the present invention as disclosed in the accompanying claims, including the full scope of equivalents thereof.

What is claimed is:

1. A method for paging a User Equipment (UE) by a radio access network in order to provide both a multimedia broadcast/multicast service (MBMS) and a non-MBMS to the UE in a mobile communication system including at least one UE and the radio access network, the method comprising:
    transmitting a first channel information about a common paging indication channel and a second channel information about a common control channel to at least one UE in advance;
    transmitting the common paging indication channel in response to an MBMS paging request of the UE;
    transmitting paging information of the MBMS through the common control channel in response to transmission of the common paging indication channel; and
    transmitting separate channel information on the common paging indication channel for identifying existence of paging for the non-MBMS and the common control channel for transmitting paging information of the non-MBMS, respectively,
    wherein the common paging indication channel identifies existence of a group paging for the MBMS and the common control channel transmits paging information of the identified MBMS.

2. The method of claim 1, wherein the common paging indication channel and the common control channel are transmitted at predetermined intervals.

3. The method of claim 2, wherein the predetermined interval has a value of an integer time of 256*k, where k=1, 2, 3, . . . , 149.

4. The method of claim 1, wherein the first channel information and the second channel information are included in a system information block of a broadcast channel.

5. The method of claim 1, wherein the common paging indication channel is transmitted based on a discrete reception (DRX) period.

6. The method of claim 1, wherein the common control channel includes a secondary common control physical channel (S-CCPCH) having an MBMS control channel (MCCH).

7. A method for receiving a paging for both a multimedia broadcast/multicast service (MBMS) and a non-MBMS by a User Equipment (UE) from a radio access network providing the MBMS to the UE in a mobile communication system including at least one UE and the radio access network, the method comprising:
    receiving a first channel information about a common paging indication channel and a second channel information about a common control channel from the radio access network in advance;
    receiving the common paging indication channel from the radio access network through the first channel information;
    receiving the common control channel from the radio access network through the second channel information, when transmission of the common control channel corresponding to the MBMS is checked by the common paging indication channel; and
    checking if the MBMS has been paged by paging information received through the common control channel; and
    receiving separate channel information on the common paging indication channel for identifying existence of paging for the non-MBMS and the common control channel for transmitting paging information of the non-MBMS respectively, wherein the common paging indication channel identifies existence of a group paging for the MBMS and the common control channel transmits paging information of the identified MBMS.

8. The method of claim 7, wherein the common paging indication channel and the common control channel are transmitted at predetermined intervals.

9. The method of claim 8, wherein the predetermined interval has a value of an integer time of 256*k, where k=1, 2, 3, . . . , 149.

10. The method of claim 7, wherein the first channel information and the second channel information are included in a system information block of a broadcast channel.

11. The method of claim 7, wherein the common paging indication channel corresponding to the MBMS is transmitted based on a discrete reception (DRX) period.

12. The method of claim 7, wherein the common control channel includes a secondary common control physical channel (S-CCPCH) having an MBMS control channel (MCCH).

13. A method for receiving a paging for both a multimedia broadcast/multicast service (MBMS) and a non-MBMS by a User Equipment (UE) from a radio access network providing the MBMS to the UE in a mobile communication system including at least one UE and the radio access network, the method comprising:

receiving a first channel information about a common paging indication channel and a second channel information about a common control channel from the radio access network in advance;

receiving the common paging indication channel from the radio access network through the first channel information;

receiving the common control channel from the radio access network through the second channel information, when transmission of the common control channel corresponding to the MBMS is checked by the common paging indication channel; and checking if the MBMS has been paged by paging information received through the common control channel, wherein the reception of the common paging indication channel is performed at a time point determined by:

MBMS PI=TMGI mod $N_{Mp}$, wherein, $N_{Mp}$ denotes a number of paging indicators transmitted on one radio frame for the MBMS and TMGI is an acronym for Temporary MBMS Group Identity.

* * * * *

UNITED STATES PATENT AND TRADEMARK OFFICE
CERTIFICATE OF CORRECTION

PATENT NO. : 7,616,611 B2  Page 1 of 1
APPLICATION NO. : 10/983862
DATED : November 10, 2009
INVENTOR(S) : Hwang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Nineteenth Day of October, 2010

David J. Kappos
*Director of the United States Patent and Trademark Office*